United States Patent [19]

Young

[11] 4,182,975

[45] Jan. 8, 1980

[54] COMPACT FLUORESCENT LAMP HAVING A PARTITIONED ENVELOPE, AND METHOD OF MANUFACTURE

[75] Inventor: Robert G. Young, Nutley, N.J.

[73] Assignee: Westinghouse Electric Corp., Pittsburgh, Pa.

[21] Appl. No.: 923,527

[22] Filed: Jul. 11, 1978

[51] Int. Cl.² .................. H01J 9/385; H01J 61/10; H01J 61/30; H01J 61/42
[52] U.S. Cl. .................. 313/485; 313/190; 313/204; 313/493; 316/20
[58] Field of Search .............. 313/493, 204, 485, 190; 316/20

[56] References Cited

U.S. PATENT DOCUMENTS

| Re. 22,896 | 7/1947 | Polevitsky | 313/204 X |
|---|---|---|---|
| 2,121,333 | 6/1938 | Barclay | 313/204 X |
| 2,133,205 | 10/1938 | McCauley | 313/204 X |
| 2,306,628 | 12/1942 | Lemmers | 313/204 |
| 2,451,043 | 10/1948 | Pennybacker | 313/204 X |
| 2,824,993 | 2/1958 | DeVriend et al. | 313/204 X |
| 3,024,383 | 3/1962 | Doering | 313/204 X |
| 3,508,103 | 4/1970 | Young | 313/204 X |
| 3,609,436 | 9/1971 | Campbell | 313/204 X |

FOREIGN PATENT DOCUMENTS

| 889951 | 9/1953 | Fed. Rep. of Germany | 313/204 |
| 481085 | 8/1975 | U.S.S.R. | 313/204 |

*Primary Examiner*—Palmer C. Demeo
*Attorney, Agent, or Firm*—D. S. Buleza

[57] ABSTRACT

The envelope of a single-ended fluorescent lamp is provided with an inserted partition assembly that forces the arc discharge to follow a tortuous path which is longer than the envelope, thus reducing the size of the lamp and providing a concentrated light source which is suited for use in lighting fixtures that are designed for incandescent type lamps. The inherent tendency of the arc to bypass the partition is overcome by seating the end of the partition assembly against a soft gasket of porous material (preferably fibrous in structure) that is located at the sealed end of the envelope and constitutes a barrier to the discharge which blocks the direct arc-path between the adjacent electrodes. The porous gasket is part of a diaphragm assembly and, since it is permeable to gases and vapors, it does not interfere with the evacuation of gaseous impurities and water vapor from the envelope when the lamp is being manufactured. Potential arc-leakage paths along the envelope-partition interface are sealed by a filling of phosphor deposited along such regions during lamp manufacture. The porous gasket preferably comprises a pad of felt-like inert material that extends completely across the interior of the envelope, or one which has a central opening and is of annular shape and held in place by a pair of suitable planar members—one of which is seated against a flanged end of the partition assembly. The envelope, partition, diaphragm and electrode components are assembled in a manner which prevents oxidation of the tungsten wire electrodes and also permits the organic binder, solvent constituent, etc. to be removed from the phosphor coatings without contaminating the electrodes.

13 Claims, 11 Drawing Figures

COMPACT FLUORESCENT LAMP HAVING A PARTITIONED ENVELOPE, AND METHOD OF MANUFACTURE

CROSS-REFERENCE TO RELATED APPLICATIONS

The subject matter of this application is related to that disclosed and claimed in concurrently-filed Application Ser. No. 923,526 of R. G. Young, the author of the present invention, which application is assigned to the same assignee as this application.

BACKGROUND OF THE INVENTION

1. Field of the Invention

This invention relates to electric discharge lamps and has particular reference to an improved fluorescent lamp of compact size and high brightness that is suitable for use as a replacement for incandescent lamps of the type employed in residential and commercial lighting fixtures.

2. Description of the Prior Art

Electric discharge lamps having envelopes which are internally partitioned to provide one or more elongated discharge paths are well known in the art. U.S. Pat. No. 2,121,333 issued June 21, 1938 to Barclay discloses such a lamp having glass panels which are joined to the glass envelope and serve as the partition means. U.S. Pat. No. 3,024,383 issued March 6, 1962 to Doering discloses the use of a thin sheet of glass or ceramic, or a stiffened sheet of fiberglass or the like, as the partition component for a fluorescent lamp. The partition is supported by a disc-like base member that is seated on top of the stem and short-circuiting of the arc is prevented by thickening the edges and/or elastically seating the edges of a glass-textile or fiberglass partition against the envelope wall, or by providing the edges of a rigid partition with a compressible or elastic border or lining of fiberglass.

Fluorescent lamps having partitions that are fabricated from sheet metal which is coated with phosphor are also known in the art and are disclosed in U.S. Pat. No. Re. 22,896, issued July 8, 1947 to Polevitzky and U.S. Pat. No. 3,508,103 issued Apr. 21, 1970 to Young, the author of the present invention. A single-ended fluorescent lamp which contains a concentric glass cylinder and several electrodes which are sequentially energized in such a manner that the arc passes through the cylindrical partition and sweeps around the annular chamber defined by the partition and the envelope is disclosed in U.S. Pat. No. 3,609,436 issued Sept. 28, 1971 to Campbell.

Low-pressure double-ended discharge lamps that contain a filler component comprising a grooved glass rod, a series of mica discs or glass wool that is positioned between the electrodes and causes the discharge to follow different paths in random fashion and thus produce a changing or animated luminous effect are described in U.S. Pat. No. 2,133,205 issued Oct. 11, 1938 to McCauley. A fluorescent lamp that contains a plug of glass wool or metal foil which fills the chambers behind the electrodes at each end of the envelope and prevents the lamp from triggering an explosion in mines or similar environments, should the glass envelope be broken, is disclosed in U.S. Pat. No. 2,824,993 issued Feb. 25, 1958 to DiVriend et al.

SUMMARY OF THE INVENTION

While the prior art partition lamps were satisfactory from a functional standpoint in that they provided compact fluorescent lamps of high light output, they were difficult and expensive to manufacture on a mass-production basis and also had certain features which presented serious quality control problems. The use of rigid partition members that are sealed to the walls of a glass envelope, for example, frequently introduced strains in the glass which could cause the envelope to crack under certain conditions. The use of a stiff plate or disc of solid material as a laterally-extending support means for the partition member also made it very difficult to evacuate water vapor and other gaseous impurities from the envelope during manufacture since the support member constituted an internal obstruction to the free passage of the gases. In lamp designs where the partition component was not tightly joined to the envelope but merely inserted into place, the inherent tendency of the arc to seek and pass through small gaps and crevices between the partition and walls of the envelope and thus bypass the partition also constituted a serious problem.

All of the foregoing problems are overcome in accordance with the present invention by employing an inserted tight-fitting partition assembly and placing its end portion in abutting engagement with a diaphragm comprising a gasket of compliant material that is permeable to water vapor and gases and extends across the interior of the envelope. The gasket is preferably made from soft porous material which constitutes a barrier to the arc discharge but does not impede the passage of gases and vapors. The arc is thus prevented from bypassing the partition in the finished lamp without interfering with the purging of vaporous and gaseous impurities from the envelope during lamp manufacture. This is particularly advantageous in lamps of single-ended construction that have both electrodes located at the sealed end of the envelope.

Minute cracks or gaps along the longitudinal edges of the inserted partition which might constitute leakage paths for the arc discharge are avoided by fabricating the partition from sheet metal and making it of such size that it must be bowed slightly to fit within the envelope, thus firmly pressing the longitudinal edges of the partition against the walls of the envelope. Additional protection against possible arc-leakage paths along the partition edges is achieved by filling the junctures formed by the mating edge portions of the partition and envelope wall with phosphor material during lamp manufacture.

In an alternative embodiment, the soft porous gasket is of annular configuration and sandwiched between a pair of plate-like holders to provide a diaphragm assembly which leaves the peripheral portion of the gasket exposed so that it makes a snug fit with the envelope wall. The end of the partition is secured to one of the gasket-holders to prevent the arc from bypassing the partition and exhaust ports or passageways are provided in the gasket holders to permit gaseous impurities to pass through the diaphragm and thus facilitate envelope evacuation.

Protection of the tungsten wire electrodes from oxidation and contamination during lamp manufacture is achieved by baking the phosphor-coated envelope and inserted phosphor-coated partition as a separate subassembly before the electrode-diaphragm-stem assembly is inserted into and sealed to the envelope.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

While the present invention can be advantageously employed in various kinds of electric discharge lamps that have partitioned envelopes and require some means for confining the discharge to an elongated arc path without impeding the passage and removal of vapors or gases during lamp manufacture, it is particularly adapted for use in conjunction with low-pressure type electric discharge lamps such as single-ended fluorescent lamps and it has, accordingly, been so illustrated and will be so described.

Figure 1:
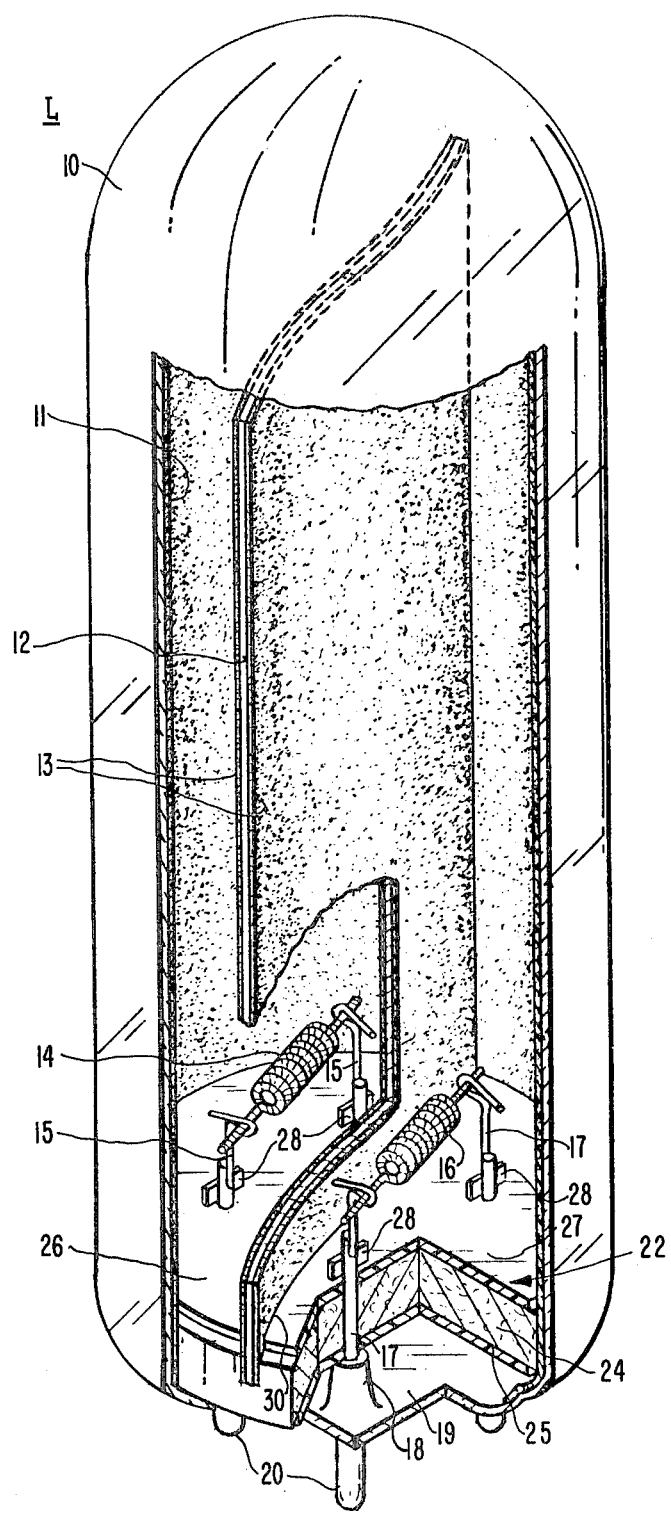
FIG. 1 is a pictorial view of a fluorescent lamp that embodies the invention, portions of the envelope and inner components being removed for illustrative purposes.

A fluorescent lamp L of such construction is shown in FIG. 1 and comprises a tubular glass envelope 10 of circular cross-section that has its inner surface coated with a layer 11 of suitable ultraviolet-responsive phosphor in accordance with standard lamp-making practice. The top portion of the envelope 10 is dome-shaped and the envelope interior is divided into a continuous discharge channel of retroverted or U-shaped configuration by a planar partition 12 that extends longitudinally within the envelope and is spaced from its domed end. While the partition 12 can be fabricated from any suitable sheet or planar material that will withstand the temperatures involved and will not contaminate the lamp, it is preferably fashioned from sheet metal that is resilient and dimensioned so that its longitudinal edges contact and make a tight fit with the walls of the envelope 10. The surfaces of the partition 12 are also coated with a suitable ultraviolet-responsive phosphor 13 in order to obtain maximum light output when the lamp is energized.

A pair of suitable thermionic electrodes such as cathodes 14 and 16 are disposed on opposite sides of the partition 12 and are held in such position by suitable conductors such as pairs of lead wires 15 and 17, respectively, that are attached to the ends of the cathodes. The lead wires are sealed through bosses 18 formed on a glass wafer-like stem 19 (shown clearly in FIG. 3) that is fused to the envelope 10 and thus serves as an end wall which hermetically closes the envelope. The outer ends of the lead wires 15 and 17 are connected to suitable contact members such as four metal pins 20 that are anchored in the respective bosses 18 and serve as lamp terminals.

In accordance with the usual practice, the cathodes 14 and 16 preferably comprise helical tungsten-wire coils that are coated with a suitable electron-emissive material and the envelope 10 is evacuated through a glass tubulation 21 (shown in FIG. 3) which protrudes from the wafer stem 19 and is subsequently hermetically closed or tipped off after the evacuated envelope has been charged with a suitable starting gas and dosed with a predetermined amount of mercury. When the lamp L is energized, the arc discharge passes from one of the cathodes along one leg of the U-shaped discharge channel, over the top of the partition 12 through the domed end of the envelope 10, and down through the other leg of the channel of the other electrode. The ultraviolet radiations generated by the mercury-vapor discharge excite the phosphor coatings 11 and 13 and cause them to emit visible radiations, thus providing a compact light source of high brightness.

Figure 2:
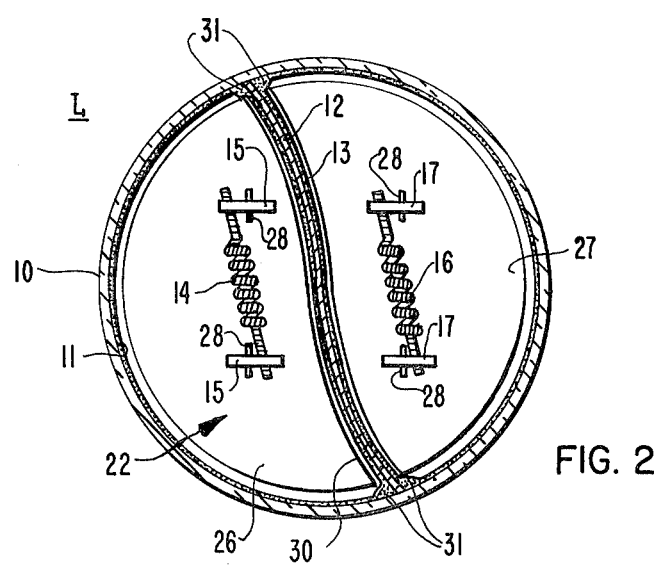
FIG. 2 is a cross-sectional view of the lamp shown in FIG. 1.
Figure 3:
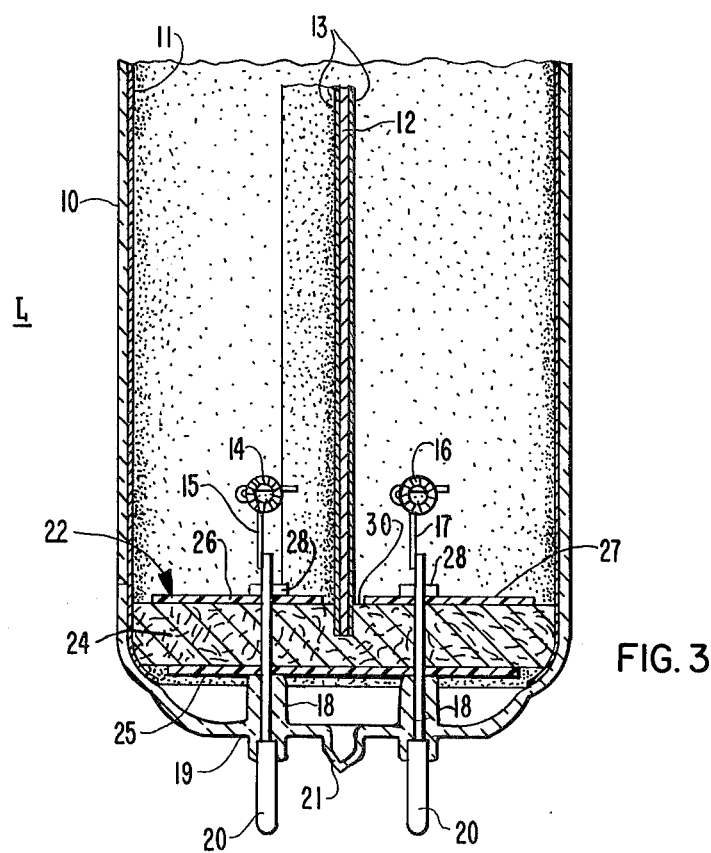
FIG. 3 is a longitudinal sectional view of the sealed end portion of the lamp.

In accordance with the present invention, the arc discharge is prevented from bypassing the partition 12 and short-circuiting the U-shaped discharge channel by a diaphragm assembly 22 that is located within the sealed end of the lamp L. As shown in FIGS. 1 and 3, the diaphragm assembly comprises a pad-like gasket component 24 of compliant porous material that is seated against the end of the partition 12 and extends completely across the interior of the envelope 10 so that it forms a septum which isolates the cathodes 14 and 16 from each other and separates the cathodes and partition from the sealed end portion of the envelope and the tubulated wafer stem 19. To ensure that the soft gasket 24 remains in this position, it is placed between suitable planar holders such as a rigid disc 25 of suitable electrically non-conductive material (such as mica) and a pair of generally semi-circular plates 26, 27 of similar non-conductive sheet material that are spaced from one another (as shown in FIG. 2) to provide a slot opening 30 through which the end portion of the partition 12 extends. The plates 26, 27 are held in sandwiched relationship with the porous gasket 24 and the disc 25 by small metal tabs 28 that are welded to the respective lead wires 15 and 17, thus firmly seating disc 25 on the stem bosses 18.

As will be noted in FIGS. 1 and 3, the end portion of the partition panel 12 is in pressured and nested relationship with the compliant gasket 24 and is thus completely recessed within the confines of the gasket. This eliminates any gaps or fissures along the end edge of the partition 12 through which the arc might jump instead of following the desired path along the partition and through the domed end of the envelope 10.

As shown in FIG. 3, the periphery of gasket 24 is in contact with the surrounding walls of the envelope 10 and thus provides a barrier which prevents the arc from short-circuiting around the outer edges of the diaphragm assembly 22. Even though the disc-shaped gasket 24 isolates the sealed end portion of the lamp L from the main or body portion of the envelope 10, it permits the envelope to be purged of water vapor and other gaseous impurities during lamp manufacture through the exhaust tube 21 in the usual efficient fashion since the gasket is porous and thus permeable to such vapor and gases. Permeability of the diaphragm assembly 22 is insured by making the gasket-retaining members 25, 26 and 27 of such size that they are spaced from the walls of the envelope 10 and also provide a slit opening 30 that is wider than the thickness of the phosphor-coated partition 12. If desired, suitable apertures may also be provided in the retaining members to permit freer passage of vapors and gases during the envelope-exhaust operation.

The gasket 24 is of sufficient thickness to capture and neutralize any electrons and ions which strike it and seek to penetrate it in order to bypass the partition 12. The gasket 24 is preferably made from fibrous material such as glass wool, quartz wool, or a wool composed of suitable ceramics. Excellent results have been obtained with gaskets composed of fine thread-like fibers of silica and alumina that are interlocked and form a fluffy felt-like body. Material made from such fiberized ceramics is marketed by the Carborundum Company, Niagara Falls, N.Y., under the trademark "Fiberfrax". Gaskets composed of electrically-conductive fibrous material (such as steel wool or the like) can also be used, providing the lead wires 15 and 17 which extend through the gasket are provided with suitable insulators to prevent them from being short-circuited by the conductive material.

The gasket can also be composed of a material which is not fibrous in structure, for example an inert sponge-like material which will withstand the temperature, etc. and will not introduce impurities into the lamp and which also has a sufficient cellular and porous structure to enable the envelope 10 to be readily evacuated through the exhaust tube 21 in the conventional manner.

The partition 12 is preferably fabricated from a resilient material such as sheet metal and it is made slightly wider than the inner diameter of the envelope 10 so that it is bowed (in a manner such as that shown in FIG. 2) and is thus slightly S-shaped in cross-section with its longitudinal edges firmly pressed against the walls of the tubular envelope 10. If desired or necessary, any remaining cracks or gaps along the side edges of the partition 12 through which the arc may penetrate can be eliminated by depositing a bead or stripe 31 of phosphor (see FIG. 2) along each edge of the partition to form a filling that "seals" the envelope-partition interface. Potential arc-leakage paths along such regions are thus blocked without rigidly joining or attaching the partition to the envelope walls and risking the danger of introducing glass strains that could weaken the envelope and to cause it to fracture while the lamp is being manufactured, is in use or being shipped.

Figure 4:
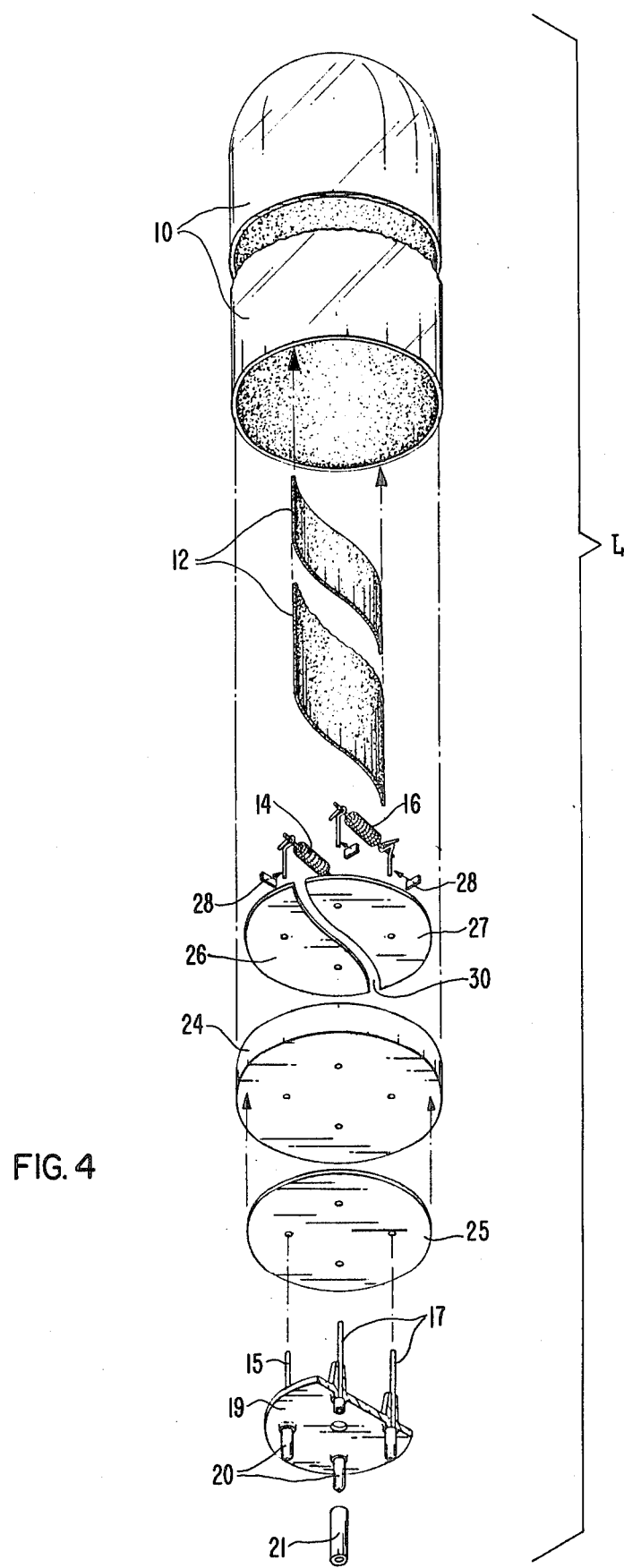
FIG. 4 is an exploded view of the various lamp components showing the manner in which they are assembled.

The manner in which the lamp L is manufactured is illustrated in FIG. 4. As indicated, the phosphor-coated partition member 12 is first inserted into and force-fitted with the tubular envelope 10, which has also been previously coated with phosphor. This assembly is then baked in air to remove the volatile constituents and the organic binder from the phosphor coatings. Such binders and volatile constituents (solvent and liquid vehicle) are well-known materials in the fluorescent lamp art and are used to make the "paint" in which the phosphor particles are suspended. The deposited phosphor paint is baked to form the desired layer of phosphor. The exhaust tube 21 is fused to the central opening in the glass wafer-like stem 19 and the sealed-in lead wires 15 and 17 of the stem are threaded through the apertured support disc 25, the apertured porous gasket 24 and apertured holder plates 26 and 27. The protruding ends of the lead wires are then welded to the wire clamps attached to the ends of the cathodes 14 and 16 and the metal tabs 28 are spot welded to the leads to complete the electrode-diaphragm-stem subassembly. This subassembly is then inserted into the envelope 10 and oriented so that the bottom edge of the S-bowed partition 12 passes through the S-shaped slot 30 between the holders 26, 27 and is pressed into nested relationship with the soft gasket 24. The rim of the wafer stem 19 is subsequently heat softened and fused to the rim of the envelope 10. The lamp is completed in the usual fashion by connecting the glass tubulation 21 to a suitable exhaust system, charging the evacuated envelope 10 with fill gas and dosing it with a measured amount of mercury, and then tipping off or sealing the end of the tubulation.

Fabricating the lamp L in the aforesaid manner provides an important manufacturing advantage since the tungsten wire coils used in the cathodes 14 and 16 are not baked in air along with the assembled phosphor-coated envelope and partition when the volatile constituents and organic binder are being removed from the phosphor coatings. The tungsten coils are thus not oxidized and the cathodes are also not contaminated with the vaporized liquid constituents or residue of the organic binder which are released by the phosphor coatings during the baking operation. Oxidation of the tungsten electrodes 14, 16 would be very detrimental since it would lead to deposits on the phosphor coatings and a resultant decrease in light output of the finished lamp.

As a specific example for those who may wish to practice the invention, an experimental compact fluorescent lamp embodying the invention having an envelope 20 cms. long and 3.5 cms. inside diameter produced 580 lumens at 32 lumens per watt when operated on a 60 cycle 120 volt power source with a suitable starting and ballast circuit of the type normally employed with fluorescent lamps. The envelope was coated with a blend of three phosphors consisting of manganese-activated zinc silicate, europium-activated strontium chloroapatite and europium-activated yttrium oxide. The lamp contained two 15 watt type electrodes and a partition 16.6 centimeters long and 3.6 cms. wide that was fabricated from sheet nickel 0.13 millimeter thick. The partition was also coated with the same phosphor blend as that employed on the envelope and the latter was sealed by a four-lead wafer glass stem which was fitted with a gasket of "Fiberfrax" ceramic fiber that was approximately 4 millimeters thick and sandwiched between mica retaining members. The envelope was filled with argon at a pressure of about 4 torr and was dosed with approximately 10 milligrams of mercury. The lamp operated at approximately 18 watts at 52 volts and 0.4 ampere. The lamp could thus be used as a direct replacement for incandescent lamps in lighting fixtures that are suitably modified to include the usual circuit components required to start and operate a fluorescent lamp.

ALTERNATE LAMP EMBODIMENT (FIGS. 5-6)

Figure 6:
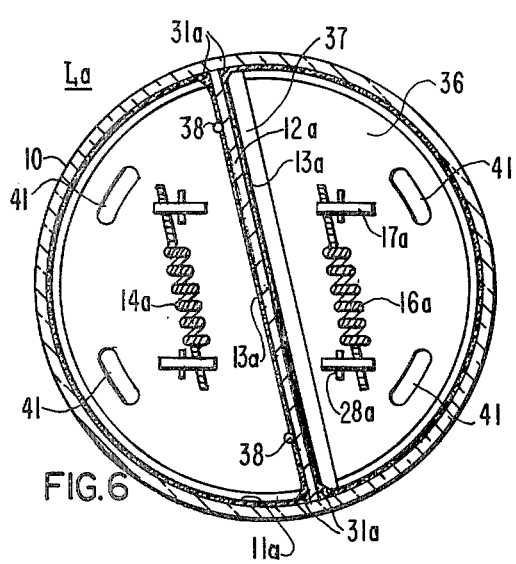
FIG. 6 is a cross-sectional view of the alternative lamp shown in FIG. 5.
Figure 5:
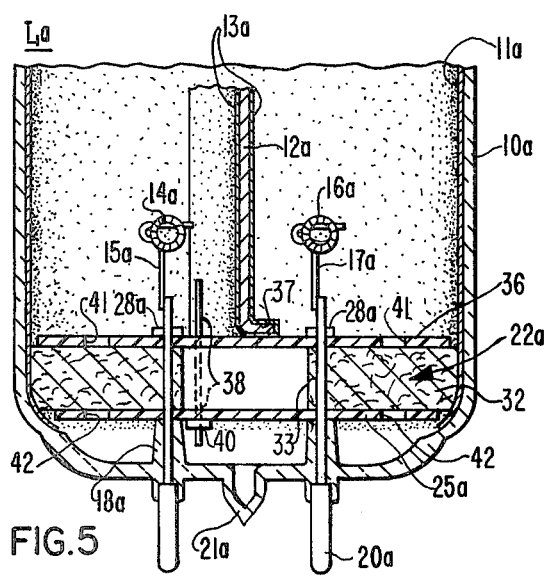
FIG. 5 is a sectional view of the sealed end portion of an alternative fluorescent lamp embodiment that contains a modified diaphragm assembly.

The invention is not limited to the use of gasket components that completely fill the cross-section of the envelope but includes within its scope gaskets that have a medial portion removed and are thus of generally annular configuration. An alternative fluorescent lamp embodiment La having a diaphragm assembly 22a with such an annular type gasket 32 of permeable fibrous material is shown in FIGS. 5 and 6. As will be noted, the gasket 32 is provided with a circular central opening 33 and is held in place by a bottom disc 25a of mica or the like and a top disc 36 of similar non-conductive material. Short-circuiting of the partition 12a by the arc is prevented by providing the end of the partition with a flange 37 that is maintained in firm seated engagement with the holder-disc 36 by a pair of metal pins 38 that are fastened to the partition, extend through the gasket 32 and are interlocked with the other holder-disc 25a by a welded metal tab 40 (see FIG. 5). Since holder-discs 25a and 36 are both of solid construction, they are preferably provided with a number of ports such as arcuate openings 41 and 42, respectively, to provide exhaust passageways through the diaphragm assembly 22a.

As will be noted in FIG. 6, the partition 12a is only very slightly bowed due to the constraining and rigidifying effect of its flanged end. The same combination of cathodes 14a, 16a, lead wires 15a, 17a, etc. and made of construction as that used in the FIGS. 1-3 lamp embodiment are employed.

Figure 7A:
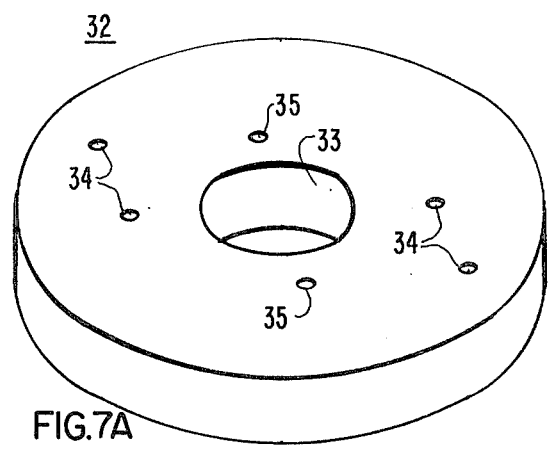
FIGS. 7A–7C are perspective, plan and side elevational views, respectively, of the annular-shaped gasket component used in the diaphragm assembly shown in FIGS. 5 and 6.
Figure 7B:
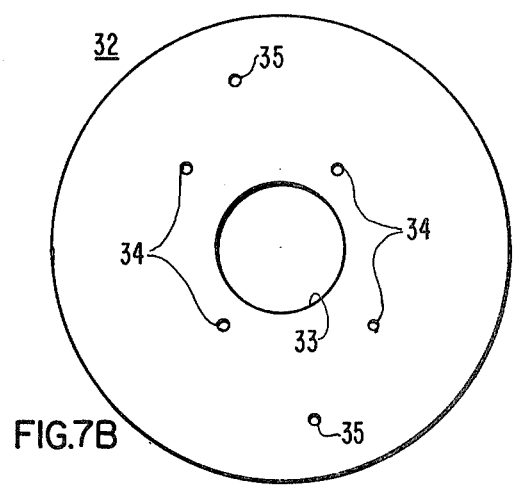
Figure 7C:
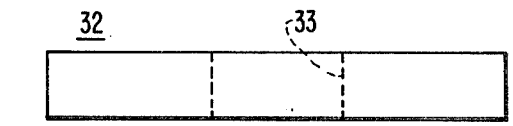

As shown in FIGS. 7A-7C, in addition to the central opening 33 the annular gasket 32 has two pairs of smaller apertures 34 for the lead wires 15a, 17a and another set of small apertures 35 for the partition-pins 38.

Figure 8:
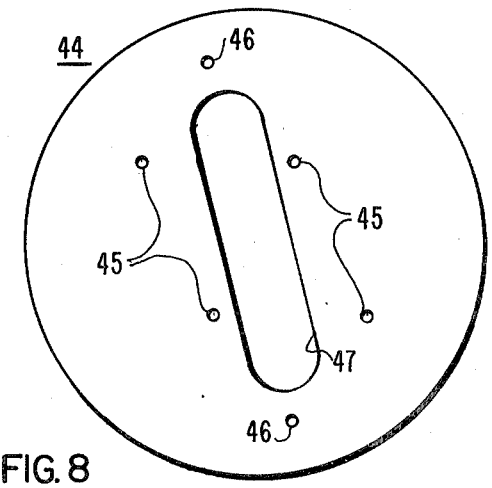

In FIG. 8 is shown another form of porous gasket 44 with similar pairs of apertures 45 and 46 and an elongated central opening 47.

Figure 9:
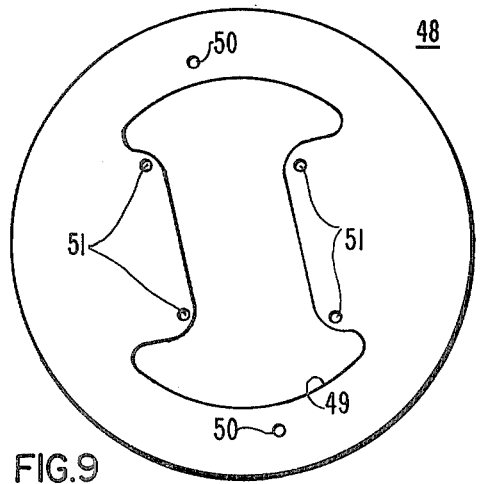
FIGS. 8 and 9 are plan views of additional alternate forms of gasket components.

FIG. 9 illustrates still another gasket embodiment 48 with an I-shaped central opening 49 and pairs of smaller apertures 50, 51.

While the disclosed lamp embodiments have a single partition and are of single-end construction, it will be apparent to those skilled in the art that partition assemblies of more complicated design having several planar segments can also be used to provide one or more arc channels which force the discharge to traverse the envelope in any desired manner, and that the invention can be used in discharge lamps that are sealed at both ends and are thus of double-ended construction.

The aforementioned blend of three different phosphors used to coat the envelope and partition component of the described experimental lamp is preferred for lighting applications where visual clarity and color rendition are especially important since the blend provides a so-called "prime color" fluorescent lamp, pursuant to the teachings of W. A. Thornton in the article entitled "Luminosity And Color-Rendering Capability Of White Light", Journal of Optical Society of America, Vol. 61, No. 9, September 1971, p. 1155.

I claim as my invention:

1. A low-pressure electric discharge lamp adapted for use as a compact light source in fixtures designed for residential and commercial lighting applications, said lamp comprising:
   a sealed light-transmitting envelope that contains an ionizable medium which sustains an arc discharge when the lamp is energized,
   partition means within said envelope defining a discharge channel that traverses the envelope in tortuous fashion,
   an electrode disposed at each end of said discharge channel,
   conductor means extending into said envelope and connected to said electrodes,
   means for confining the arc discharge to said tortuous discharge channel comprising a diaphragm assembly that extends across the interior of the envelope and is in engagement with an end portion of said partition means, said diaphragm assembly comprising (a) a porous body of material that is permeable to vapors and gases and (b) rigid holding members that are disposed in overlying sandwiched relationship with said porous body of material, and
   a sealed tubulation integral with a part of said envelope that is separated from said electrodes and partition means by said diaphragm assembly,
   the rigid holding members of said diaphragm assembly being so shaped and arranged that the peripheral portion of said porous body of material is exposed and in contact with the wall of the envelope and said porous body of material thus comprises a gasket which prevents the arc discharge from bypassing the partition means but permits water vapor and gaseous impurities to be evacuated from the envelope through said diaphragm assembly and tubulation prior to the sealing of said tubulation.

2. The compact low-pressure discharge lamp of claim 1 wherein;
   said porous gasket comprises a compliant body of material that extends completely across the interior of the envelope,
   said rigid gasket-holding members are of planar configuration, and
   the said end portion of the partition means extends through an opening in the associated face of the diaphragm assembly and is in engagement with the porous gasket.

3. The compact low-pressure discharge lamp of claim 1 wherein;
   said porous gasket comprises a pad-like body that has a medial opening, and
   the holding member of said diaphragm assembly that is disposed between said gasket and the said end portion of the partition means is of planar configuration and extends over and closes the medial opening in the porous gasket.

4. The compact low-pressure discharge lamp of claim 1 wherein said partition means has resilient planar segments that are in tight press-fitted engagement with the envelope walls and are bowed by the resulting compression so that the edges of the planar segments are firmly seated against the envelope walls.

5. The compact low-pressure discharge lamp of claim 1 wherein;
   said ionizable medium includes a fill gas and mercury which provide an arc discharge that generates ultraviolet radiation when the lamp is energized, and
   said partition means has planar surfaces that are coated with an ultraviolet-responsive phosphor and said lamp thus comprises a fluorescent lamp.

6. The compact fluorescent lamp of claim 5 wherein;
   said envelope is of tubular configuration,
   said partition means comprises an elongated structure that extends longitudinally within said envelope and across the envelope interior and has its longitudinal edges seated against the walls of said envelope, and
   a layer of phosphor extends along the junctures formed by the longitudinal edges of the partition structure and associated wall portions of the envelope and provides a filling therealong which prevents the arc from bypassing the partition structure.

7. The compact fluorescent lamp of claim 5 wherein;

said envelope is of tubular configuration, and said electrodes are disposed at one end of the envelope with the partition means extending therebetween and said fluorescent lamp is thus of the single-ended type.

8. The single-ended fluorescent lamp of claim 7 wherein;

said partition means comprises a sheet-metal assembly that is inserted into and extends longitudinally within the envelope, and said porous gasket comprises a pad-like body of fibrous material that is electrically non-conductive.

9. The single-ended fluorescent lamp of claim 8 wherein;

said fibrous pad-like gasket is composed of a material from the group consisting of glass wool, quartz wool, and fiberized ceramic material.

10. The single-ended fluorescent lamp of claim 8 wherein;

the inner walls of said envelope are also coated with an ultraviolet-responsive phosphor, said conductor means comprises lead wires that extend through said diaphragm assembly and the associated end of the envelope, and said tubulation comprises a tipped-off vitreous tube that protrudes from said associated end of the envelope.

11. The single-ended fluorescent lamp of claim 10 wherein;

the rigid gasket-holding members of said diaphragm assembly comprise a pair of plate-like components that are retained in sandwiched relationship with said pad-like gasket by the lead wires, and the sheet-metal partition assembly has a flanged end portion that is seated against the diaphragm assembly.

12. The single-ended fluorescent lamp of claim 11 wherein;

said envelope is of substantially uniform circular cross-section, said plate-like gasket-holding members each comprise a disc of electrically non-conductive material, and said discs each have at least one opening therein which provide a passageway through the porous gasket and said diaphragm assembly.

13. The method of manufacturing a single-ended fluorescent lamp that has a partitioned envelope which defines a tortuous discharge channel, said method comprising;

coating the inner surface of a glass envelope with phosphor particles that are suspended in a liquid vehicle that includes a vaporizable solvent and an organic binder, said envelope being closed at one end, coating a partition component with phosphor particles that are also suspended in a binder-containing liquid vehicle, inserting the phosphor-coated partition component into the phosphor-coated envelope and baking the resulting subassembly in air at a temperature and for a time which removes the binder, solvent and liquid vehicle from the phosphor coatings, mounting a pair of electrodes on a glass stem component along with lead wires and a diaphragm assembly that includes a porous gasket component to form an electrode-diaphragm-stem subassembly that has a glass tubulation, inserting said electrode-diaphragm-stem subassembly into the phosphor-coated partition-envelope subassembly so that the end of the partition component is seated against the diaphragm assembly and then sealing the glass stem to the glass envelope to lock the components in such position, evacuating the envelope by connecting the stem tubulation to a vacuum system, and then charging the evacuated envelope with a fill gas and a dose of mercury through the stem tubulation and hermetically sealing said tubulation.

* * * * *